(12) United States Patent
Cho et al.

(10) Patent No.: US 7,768,586 B2
(45) Date of Patent: Aug. 3, 2010

(54) LIQUID CRYSTAL DISPLAY AND FABRICATION METHOD THEREOF

(75) Inventors: So Haeng Cho, Seoul (KR); Hyun Sang Chung, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/889,478

(22) Filed: Aug. 14, 2007

(65) Prior Publication Data

US 2007/0285612 A1    Dec. 13, 2007

Related U.S. Application Data

(62) Division of application No. 10/689,623, filed on Oct. 22, 2003, now Pat. No. 7,271,855.

(30) Foreign Application Priority Data

Oct. 31, 2002    (KR) .......................... 2002-0066790

(51) Int. Cl.
   *G02F 1/1333* (2006.01)
(52) U.S. Cl. .......................... 349/40; 349/152; 349/149
(58) Field of Classification Search .................. None
   See application file for complete search history.

(56) References Cited

U.S. PATENT DOCUMENTS

| | | | |
|---|---|---|---|
| 5,359,206 A | 10/1994 | Yamamoto et al. | |
| 5,757,454 A * | 5/1998 | Ogishima et al. | 349/129 |
| 5,825,439 A | 10/1998 | Noriyama | |
| 5,929,958 A | 7/1999 | Ohta et al. | |
| 6,204,906 B1 * | 3/2001 | Tannas, Jr. | 349/153 |
| 6,226,059 B1 | 5/2001 | Yamamoto et al. | |
| 6,633,361 B1 | 10/2003 | Fujita | |
| 6,870,559 B2 | 3/2005 | Kanno | |
| 2003/0107687 A1 * | 6/2003 | Choo et al. | 349/39 |

(Continued)

FOREIGN PATENT DOCUMENTS

JP    05265021 A    10/1993

(Continued)

*Primary Examiner*—David Nelms
*Assistant Examiner*—Lucy P Chien
(74) *Attorney, Agent, or Firm*—McKenna Long & Aldridge LLP (57) ABSTRACT

Disclosed is a method for fabricating a liquid crystal display. The method includes the steps of: forming a lower substrate and an upper substrate, the lower substrate including a data drive circuit connected with data lines of a thin film transistor array and a gate drive circuit connected with gate lines of the thin film transistor array, a pad part connected with the gate drive circuit and the data drive circuit, and a shorting bar connected with the pad part, the upper substrate including a color filter and a black matrix; dispensing a spacer on the lower substrate and forming a seal pattern at a display region on the upper substrate; attaching the lower substrate and the upper substrate to face with each other and then forming holes at an inner upper portion of the pads at a predetermined distance; scribing the holes-formed-portion of the pads to remove the shorting bar and dividing the attached upper and lower substrates into a plurality of LCD panels; and providing a liquid crystal layer between the upper and lower substrates.

11 Claims, 10 Drawing Sheets

U.S. PATENT DOCUMENTS

2005/0094045 A1   5/2005   Chae

FOREIGN PATENT DOCUMENTS

| JP | 06146225 A | 5/1994 |
| JP | 07072508 A | 3/1995 |
| JP | 08082805 A | 3/1996 |
| JP | 08201833 A | 8/1996 |

\* cited by examiner

LIQUID CRYSTAL DISPLAY AND FABRICATION METHOD THEREOF

This application is a Divisional of prior application Ser. No. 10/689,623, filed Oct. 22, 2003, now U.S. Pat. No. 7,271,855 which claims the benefit of Korean Patent Application No. 2002-0066790 filed in Korea on Oct. 31, 2002, which is hereby incorporated by reference in its entirety as if fully set forth herein.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display, and more particularly, to a liquid crystal display structure with a simplified fabrication process, and a fabrication method thereof.

2. Discussion of the Related Art

Generally, a liquid crystal display (LCD) displays an image corresponding to data signals on an LCD panel by controlling light transmittance of liquid crystal cells arranged in a matrix configuration on the LCD panel with video data signals supplied to each of the liquid crystal cells.

To achieve this, the LCD includes electrodes for applying an electric field to a liquid crystal layer, thin film transistors (TFTs) for selectively switching data supplied to the liquid crystal cells, data lines for supplying the liquid crystal cells with the data supplied from the exterior, and gate lines for supplying a control signal of the TFT.

The LCD is fabricated by various processes including a process of forming a lower substrate and an upper substrate of an LCD panel, accompanying a process for forming liquid crystal cells defining pixel units, a process of forming and rubbing an alignment film for aligning liquid crystal molecules, a process of attaching the upper substrate and the lower substrate, and a process of injecting and sealing liquid crystal between the upper plate and the lower plate. Here, a color filter, a common electrode and a black matrix are formed on the upper substrate. Signal lines such as data lines and gate lines are formed on the lower plate. Thin film transistor (TFT) is formed at a crossing portion of the data line and the gate line.

Figure 1:
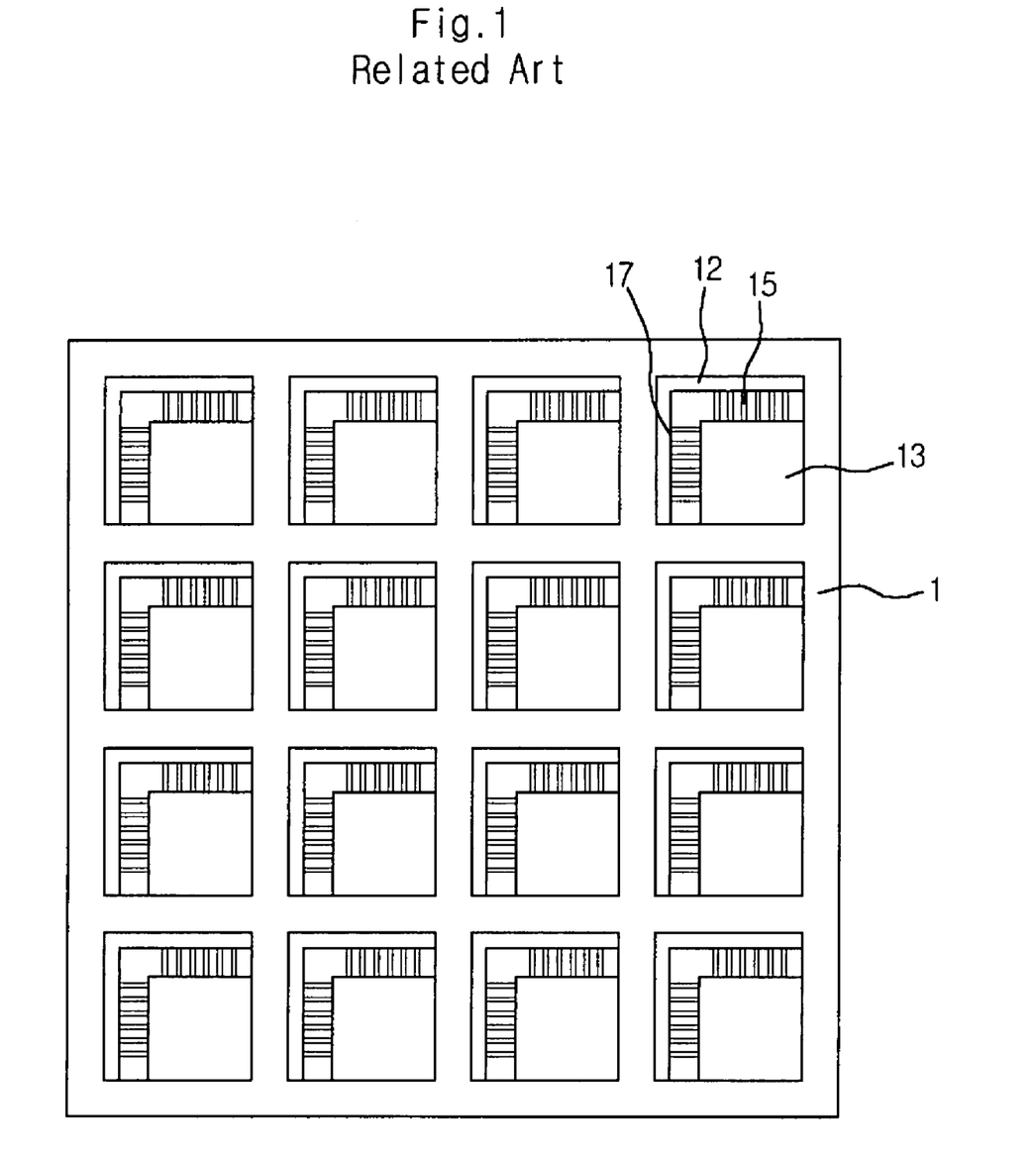
FIG. 1 is a plan view of a substrate of a liquid crystal panel on which a plurality of thin film transistor arrays are formed.

FIG. 1 is a plan view of a substrate of an LCD panel on which a plurality of thin film transistor arrays are formed.

Referring to FIG. 1, in the related art LCD fabrication method, a plurality of TFT arrays 13 are formed on a lower substrate 1. On the TFT array 13, gate lines 17 and data lines 15 are formed to cross each other at right angles. A thin film transistor (TFT) (not shown) and a pixel electrode (not shown) are formed at each crossing of the gate lines 17 and data lines 15. Each of the thin film transistor arrays 13 constitutes an independent display device.

Also, on the lower substrate 1, a pad part including a plurality of pads (not shown) connected with the data lines 15 and the gate lines 17 are provided. The pad part is connected with a shorting bar 12.

If the active layer of the thin film transistor provided on each pixel region of the LCD is made of polycrystalline silicon, a drive circuit can be formed by patterning polycrystalline silicon. Accordingly, a data drive circuit (not shown) connected with the data lines 15 of the thin film transistor array 13 and a gate drive circuit (not shown) connected with the gate lines 17 of the thin film transistor array 13 are mounted on the lower substrate 1. Also, the pad part (not shown) is connected with the gate drive circuit and the data drive circuit via corresponding link patterns. The shorting bar 12 is connected with the pad part. Here, the shorting bar 12 functions prevents static electricity from being generated while the fabrication processes are carried out.

Next, spacers are dispensed on the lower substrate 1, and seal pattern is formed on the upper substrate. The spacers and the seal pattern allow a gap to be formed between the upper substrate and the lower substrate. After that, the upper substrate 2 and the lower substrate 1 are attached to face each other, to form a mother LCD panel including a plurality of LCD panels. The mother LCD panel is then subjected to a scribing and/or breaking process and is thereby divided into a plurality of unit LCD panels.

After the scribing process is completed, liquid crystal is injected into the respective divided unit LCD panels through an injection hole in the seal pattern. The injection of the liquid crystal is carried out by the capillary phenomenon using a pressure difference between the inside of the LCD panel and the outside of the LCD panel. After the injection of the liquid crystal is completed, the injection holes are sealed and the divided unit LCD panels are subject to a grinding process in which the shorting bar is removed, and edges of the upper substrate and the lower substrate are ground to enhance a resistance against edge fracture that may be caused in the edges.

Figure 2A:
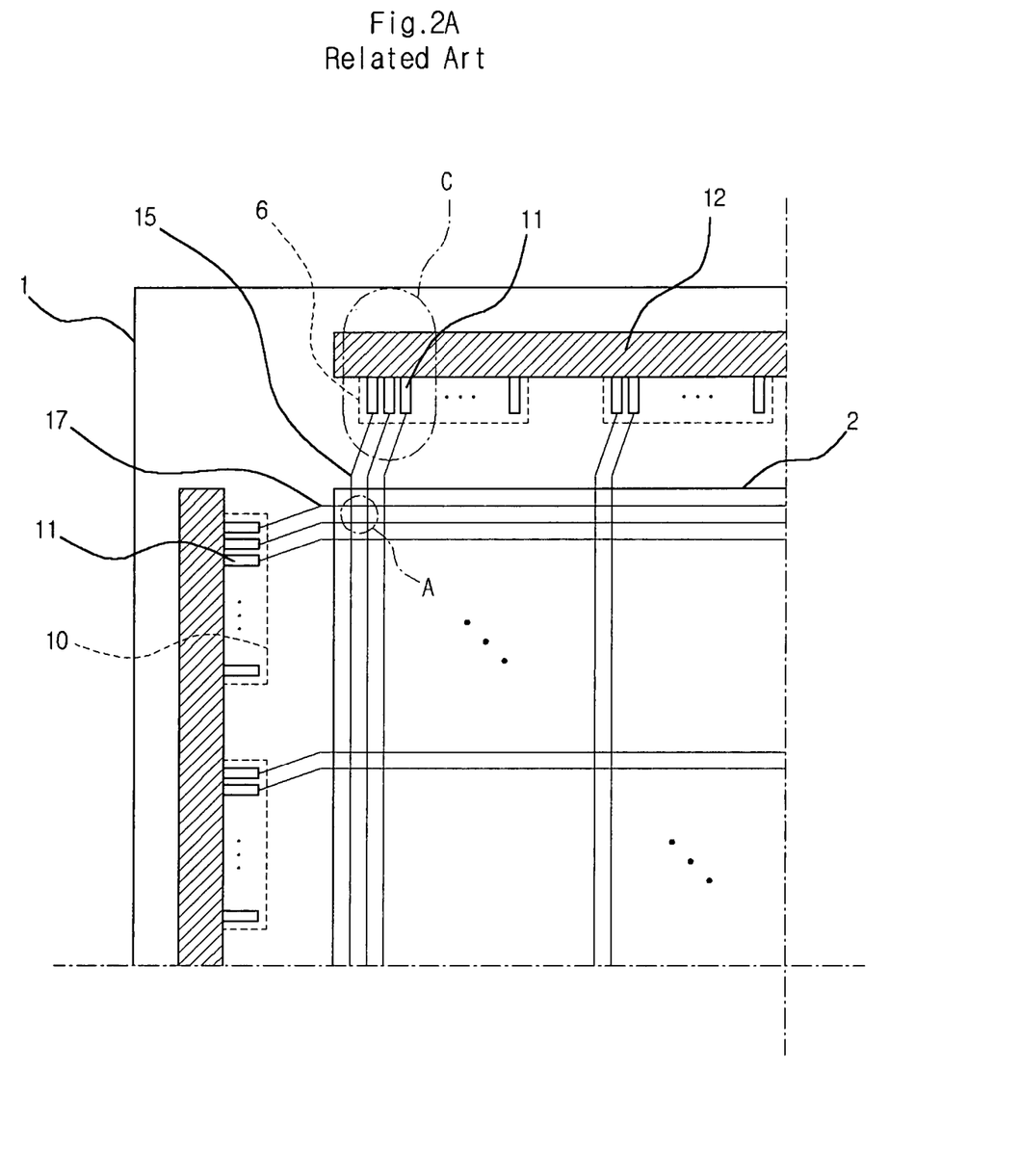
FIGS. 2A and 2B are plan views illustrating a periphery of a related art LCD.
Figure 2B:
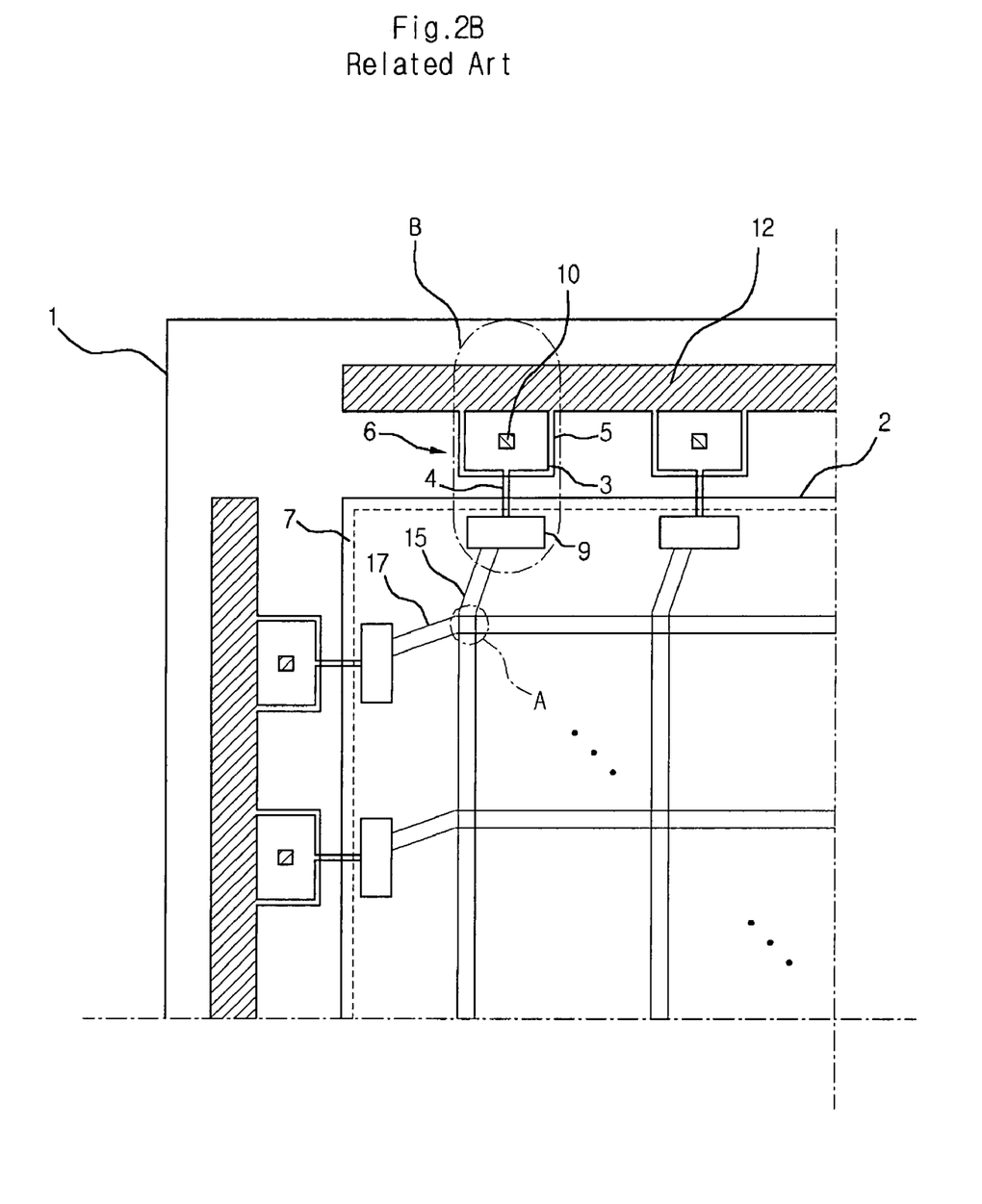

FIGS. 2A and 2B are plan views illustrating a periphery of a related art LCD. Specifically, FIG. 2A illustrates an amorphous silicon (a-Si) TFT LCD, and FIG. 2B illustrates a polycrystalline silicon (poly-Si) TFT LCD.

Referring to FIG. 2A, the related art LCD includes an upper substrate 2, a lower substrate 1 facing the upper substrate 2, a liquid crystal layer (not shown) interposed between the upper substrate 2 and the lower substrate 1, a plurality of pad parts 6 mounted on edges of the lower substrate 2, a plurality of data lines 15 and a plurality of gate lines 17 extending from respective pads 11 of the pad parts 6. The plurality of data lines 15 and the plurality of gate lines 17 are shaped in a matrix configuration. A pixel region (A) provided with thin film transistor and pixel electrode is formed at each of crossing portions of the plurality of data lines 15 and the plurality of gate lines 17.

The shorting bar 12 is provided above the pad parts 6 and is commonly connected with the pad parts 6. The shorting bar 12 is made of metal at edges of the lower substrate 1 corresponding to non-display region, and is removed from the lower substrate 1 while the edges of the lower substrate 1 are ground along cutting lines in the scribing process and the grinding process.

If the shorting bar 12 is removed as above, a tape carrier package (hereinafter referred to as 'TCP') is bonded on the pad parts by a drive circuit mounting method such as tape automated bonding (hereinafter referred to as 'TAB') method. In other words, output pads of the TCP are connected with the pad parts 6 on the lower substrate 1 and input pads of the TCP are connected with a printed circuit board (PCB).

Also, referring to FIG. 2B, the related art LCD includes an upper substrate 2, a lower substrate 1 facing the upper substrate 2, a liquid crystal layer (not shown) interposed between the upper substrate 2 and the lower substrate 1, a gate or data drive circuit 9 patterned on the lower substrate 1, for driving a plurality of data lines 15 or a plurality of gate lines 17, a plurality of pad parts 6 connected with the gate or data drive circuit 9 via a link pattern 4. The upper substrate 2 and the lower substrate 1 are attached to each other with a seal pattern 7 dispensed on edges of the upper substrate 2. Liquid crystal is injected into a space defined by attaching the upper substrate 2 and the lower substrate 1.

The gate or data drive circuit 9 is located within the seal pattern 7 within a region defined by attaching the upper substrate 2 and the lower substrate 1 and is connected with the data lines 15 or the gate lines 17. A pixel region (A) including thin film transistor and pixel electrode is formed at each of crossing portions of the data lines 15 and the gate lines 17.

Also, a shorting bar 12 is provided outside the pad parts 6 and is commonly connected with the pad parts 6. The shorting bar 12 is grounded to a GND terminal during the LCD fabrication process and functions to eliminate static electricity applied to the LCD panel. The shorting bar 12 is formed for the purpose of performing IPT (In Processing Test) for the plurality of pad parts 6.

The shorting bar 12 is made of metal at edges of the lower substrate 1 corresponding to non-display region and is removed from the lower substrate 1 while the edges of the lower substrate 1 are ground along cutting lines in the scribing process and the grinding process.

FIGS. 2A and 2B are discriminated from each other by a difference in the material of the active layer, i.e., the active layer of FIG. 2A being made of amorphous silicon while the active layer of FIG. 2B being made of polycrystalline silicon. Hence, according to the material used as the active layer, the drive circuit may be patterned on the lower substrate or formed separately from the lower substrate.

As a result, the structures of the pad parts formed on the lower substrate and the shorting bar connected with the pad parts shown in FIG. 2A are the same as those shown in FIG. 2B. However, there is a difference between FIG. 2A and FIG. 2B in that in case of FIG. 2A, the data lines 15 and the gate lines 17 extend directly from the respective pads 11 of the pad parts 6, but in case of FIG. 2B, the data lines 15 and the gate lines 17 extend via the link pattern 4 formed by patterning within the pad part 6 and the drive circuit 9 from the respective pads 11 of the pad parts 6.

Figure 3A:
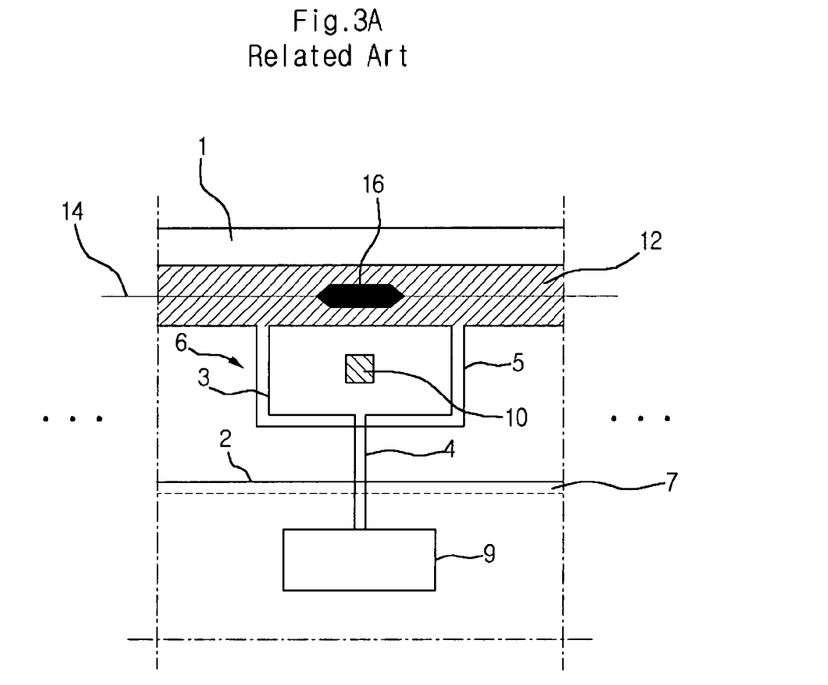
FIGS. 3A to 3C are plan views illustrating when the shorting bar shown in a selected portion of FIG. 2B is removed.
Figure 3B:
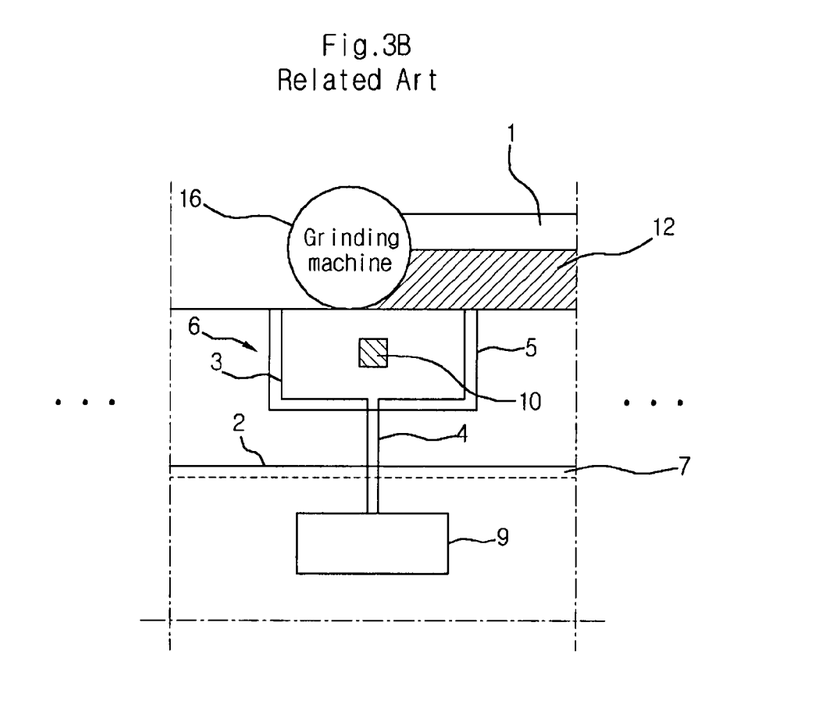
Figure 3C:
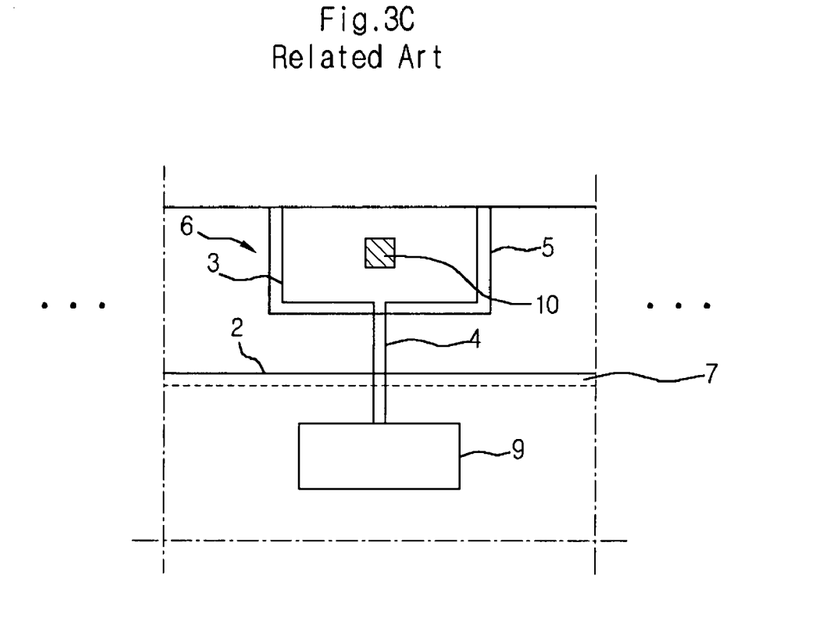

FIGS. 3A to 3C are plan views illustrating a state in which the shorting bar 12 shown in a selected portion of FIG. 2B is removed. It is noted that FIGS. 3A to 3C describe such a state with the example of FIG. 2B, but the shorting bar shown in FIG. 2A can be also removed by the same method.

A related art method for removing the shorting bar 12 will be described hereinafter with reference to FIGS. 3A to 3C.

First, as illustrated in FIG. 3A, during the scribing process, the respective unit LCD panels, i.e., thin film transistor arrays, are divided. At this point, a scribing wheel 16 scribes the mother LCD panel (the panel containing multiple unit LCD panels) along a cutting line 14 formed above the shorting bar 12.

In other words, by the scribing process, a portion of the shorting bar 12 is removed, and the remaining portion of the shorting bar 12 connected with the pad parts 6 is removed from the lower substrate 1 while it is ground by a grinding process using a grinding machine 18. The removal process of the shorting bar 12 is illustrated in FIG. 3B.

Thus, while the mother LCD panel is subject to the scribing process and the grinding process, the shorting bar 12 formed in the respective unit LCD panels is completely removed. The structure of the pad part when the shorting bar 12 is completely removed is illustrated in FIG. 3C.

However, if the shorting bar is removed as above, the shorting bar of metal may generate a lot of particles during the removal process, so that the pad may be damaged.

In addition, the scribing process and the grinding process essentially used for removing the shorting bar make the fabrication process of the LCDs complicated.

SUMMARY OF THE INVENTION

Accordingly, the present invention is directed to a liquid crystal display and fabrication method thereof that substantially obviates one or more problems due to limitations and disadvantages of the related art.

An advantage of the present invention is to provide a liquid crystal display and fabrication method thereof in which holes are formed at predetermined locations of upper side of the pad part at a predetermined distance and a scribing wheel passes on the locations where the holes are formed to remove the shorting bar only by the scribing process, thereby reducing an occurrence amount of metal particles during the removal process of the shorting bar and simplifying the fabrication process of the LCD.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a liquid crystal display provided with a thin film transistor and a pixel electrode which are formed at a cross portion of a plurality of gate lines and a plurality of data lines arranged in a matrix configuration. The liquid crystal display includes a pad connected with the plurality of gate lines or the plurality of data lines; and a shorting bar connected with the pad, wherein the pad connected with the shorting bar comprises holes formed in an inner upper portion of the pad at a predetermined distance. In the above LCD, the thin film transistor is an amorphous silicon TFT.

In an aspect of the invention, there is provided a liquid crystal display provided with a thin film transistor and a pixel electrode which are formed at a cross portion of a plurality of gate lines and a plurality of data lines arranged in a matrix configuration. The liquid crystal display includes a data drive circuit connected with the data lines and a gate drive circuit connected with the gate lines; a pad part connected with the gate drive circuit and the data drive circuit via a link pattern; and a shorting bar connected with the pad part, wherein the pad connected with the shorting bar comprises holes formed in an inner upper portion of the pad at a predetermined distance. In the above LCD, the thin film transistor is a polycrystalline silicon TFT.

In one aspect of the invention, there is provided a method for fabricating a liquid crystal display provided with a lower substrate including a plurality of pads connected with data lines and gate lines of a thin film transistor array, and a shorting bar to which the plurality of pads are connected, and an upper substrate including a color filter and a black matrix. The method includes the steps of: dispensing a spacer on the lower substrate and forming a seal pattern at a display region on the upper substrate; attaching the lower substrate and the upper substrate to face with each other and then forming holes at an inner upper portion of the pads at a predetermined distance; scribing the holes-formed-portion of the pads to remove the shorting bar and dividing the attached upper and lower substrates into a plurality of LCD panels; and providing a liquid crystal layer between the upper and lower substrates. In the above LCD, the thin film transistor is an amorphous silicon TFT.

In another aspect of the invention, there is provided a method for fabricating a liquid crystal display. The method includes the steps of: forming a lower substrate and an upper substrate, the lower substrate including a data drive circuit connected with data lines of a thin film transistor array and a gate drive circuit connected with gate lines of the thin film transistor array, a pad part connected with the gate drive circuit and the data drive circuit, and a shorting bar connected with the pad part, the upper substrate including a color filter and a black matrix; dispensing a spacer on the lower substrate and forming a seal pattern at a display region on the upper substrate; attaching the lower substrate and the upper substrate to face with each other and then forming holes at an inner upper portion of the pads at a predetermined distance; scribing the holes-formed-portion of the pads to remove the shorting bar and dividing the attached upper and lower substrates into a plurality of LCD panels; and providing a liquid crystal layer between the upper and lower substrates. In the above LCD, the thin film transistor is a polycrystalline silicon TFT.

It is to be understood that both the foregoing general description and the following detailed description of the present invention are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. The present invention is not limited to the embodiments. It will be apparent to those skilled in the art that various modifications and variations can be made in the present invention.

Figure 4A:
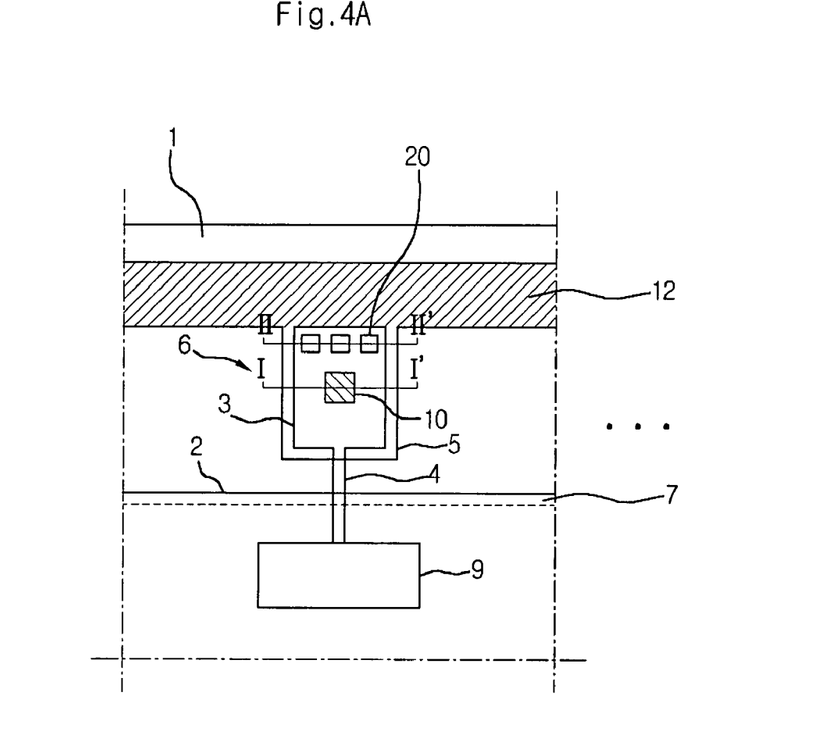
FIGS. 4A and 4B are plan views illustrating a drive circuit, a pad part and a shorting bar formed on a lower substrate of an LCD according to the present invention.
Figure 4B:
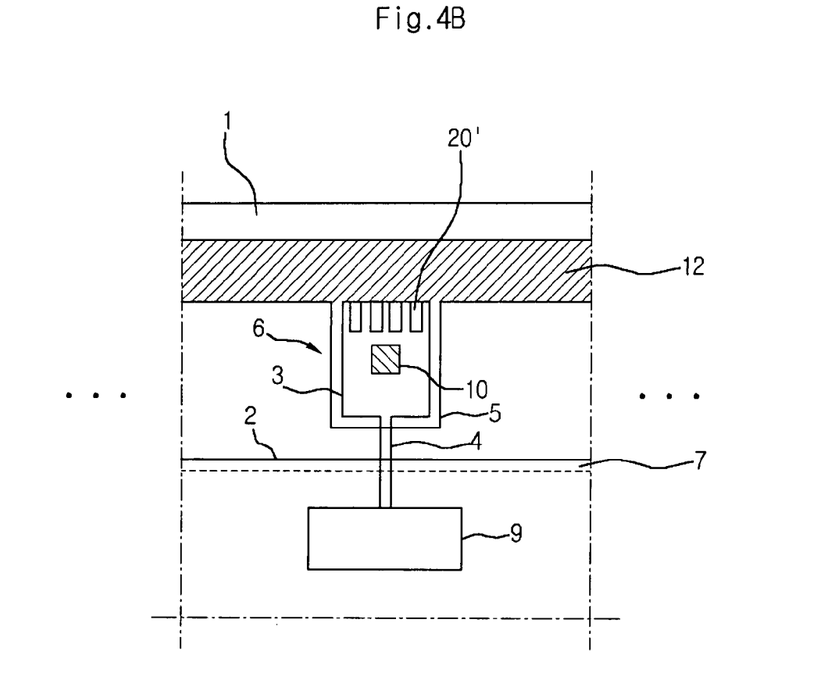

FIGS. 4A and 4B are plan views illustrating a drive circuit, a pad part and a shorting bar formed on a lower substrate of an LCD according to the present invention. Specifically, FIGS. 4A and 4B illustrate a specific portion of a polycrystalline silicon TFT LCD, i.e., a region corresponding to the specific portion (B) of FIG. 2B according to the related art.

In the above, the polycrystalline silicon TFT means that the active region of a thin film transistor (TFT) provided in each pixel region of an LCD, i.e., a channel region, is formed of polycrystalline silicon.

Referring to FIGS. 4A and 4B, an LCD according to the invention includes an upper substrate 2, a lower substrate 1 facing the upper substrate 2, a liquid crystal layer (not shown) interposed between the upper substrate 2 and the lower substrate 1, a gate or data drive circuit 9 patterned on the lower substrate 1 for driving gate lines or data lines, and a plurality of pad parts 6 connected with the gate or data drive circuit 9 via a link pattern 4.

The upper substrate 2 and the lower substrate 1 are attached to each other with a seal pattern 7 dispensed on their edges. Liquid crystal is provided a space defined by attaching the upper substrate 2 and the lower substrate 1. The liquid crystal may be injected into the space after the lower and upper substrates 1 and 2 are attached or dispensed on the surface of one of the lower and upper substrates 1 and 2 before they are attached. The gate or data drive circuit 9 is located within the seal pattern 7 inside the attachment region and is connected with gate lines or data lines.

The LCD is also provided with a shorting bar 12, which is commonly connected with the plurality of pad parts 6. The shorting bar 12 is also grounded to a GND terminal during a fabrication process of the LCD to function to eliminate static electricity applied to the LCD panel. The shorting bar 12 is formed for the purpose of performing IPT (In Processing Test) for the plurality of pad parts 6.

According to the present invention, holes or open portions 20 are formed in predetermined portions of the pad part 6 at a predetermined location on the pad part 6 and may be spaced apart by a predetermined interval.

Generally, the shorting bar 12 is made of metal and is located at edges of the lower substrate 1 corresponding to non-display region and should be removed from the lower substrate 1 after the IPT is completed.

In the related art fabrication process of LCD, the attached panel is subject to the scribing process and the grinding process. The shorting bar 12 is finally removed by grinding an upper portion of the pad part connected with the shorting bar 12.

However, as reviewed in the above, since the shorting bar and the pad part are made of metal, a lot of metal particles are generated during the removal process of the shorting bar. As a result, the pad may be damaged. In addition, the scribing process and the grinding process essentially used for removing the shorting bar make the fabrication process of the LCDs complicated.

Hence, according to the present invention, holes 20, 20' are formed in an inner upper portion of the pad part 6 connected with the shorting bar 12. The holes may be spaced apart at a constant interval. During fabrication, a scribing wheel passes on the locations where the holes 20, 20' are formed to remove the shorting bar 12 and thus overcome the aforementioned drawback caused in the related art.

In more detail, according to the invention, the shorting bar 12 is substantially removed only by a scribing process without being subject to the grinding process. Also, since the holes 20 are formed at locations where the scribing wheel passes, the amount of metal particle that is generated during the scribing process is decreased compared with that in the related art.

Moreover, the holes may be formed at the inner upper portion of the pad part 6 connected with the shorting bar 12 at a constant interval and a predetermined distance from the shorting bar 12 or the edge of the pad part 6. In addition, the holes 20 may be made in various shapes, as may be appreciated by those of skill in the art. FIGS. 4A and 4B illustrate examples of various embodiments of the present invention according to the modification in the shape of the hole 20.

First, in case of FIG. 4A, hole 20 is not formed immediately adjacent the edge of the pad part 6 connected with the shorting bar 12, taking into account resistance against a signal supplied through the pad part 6 while the IPT is carried out. Instead, the holes 20 may be formed at a predetermined portion below the edge or uppermost portion of the pad part 6 at a constant distance from the edge of the pad part 6. It is noted that the holes 20 may be formed wider relative to the hole 20' shown in FIG. 4B.

On the contrary, in case of FIG. 4B, hole 20' is formed closer to the edge of the pad part 6 connected with the shorting bar 12 and may have a narrower width than the hole 20 of FIG. 4A, thereby preventing resistance against a signal supplied through the pad part 6 from being increased. In addition, the holes 20' of the embodiment of FIG. 4B may have a reduced area compared to the holes 20 of the embodiment of FIG. 4A. As illustrated in FIG. 4B, the holes 20' may extend to the edge of the pad part 6.

There is an advantage to the holes having a greater area in that fewer particles are generated owing to a larger open, i.e., metal, area. However, the greater hole area may result in a reduced area through which the scribing wheel may be applied. For example, the hole area in the embodiment of FIG. 4A results in fewer particles being generated than the hole area provided in the embodiment of FIG. 4B, whereas the embodiment of FIG. 4B has an advantage in that failure rate is lowered since the passage through which the scribing wheel passes is widened.

Figure 5A:
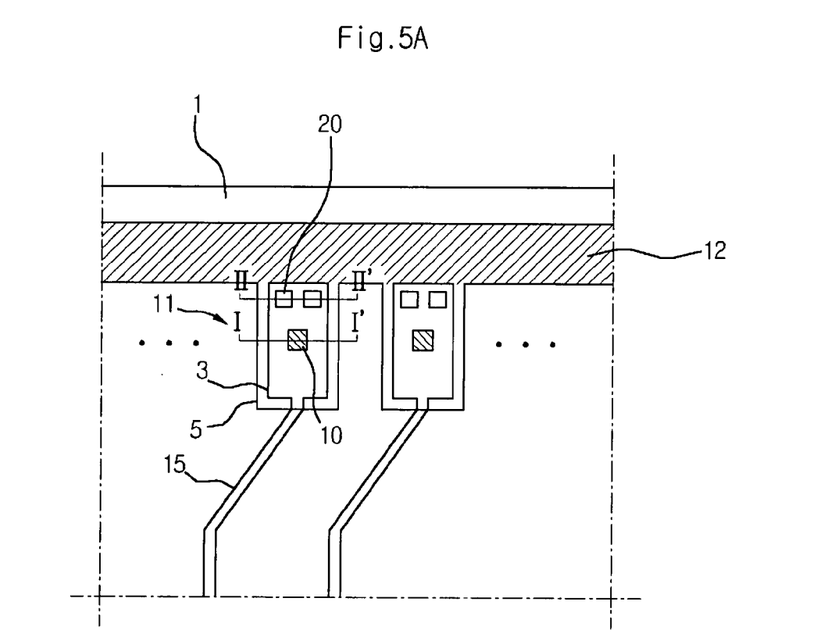
FIGS. 5A and 5B are plan views illustrating a pad part and a shorting bar formed on a lower substrate of an LCD according to the present invention.
Figure 5B:
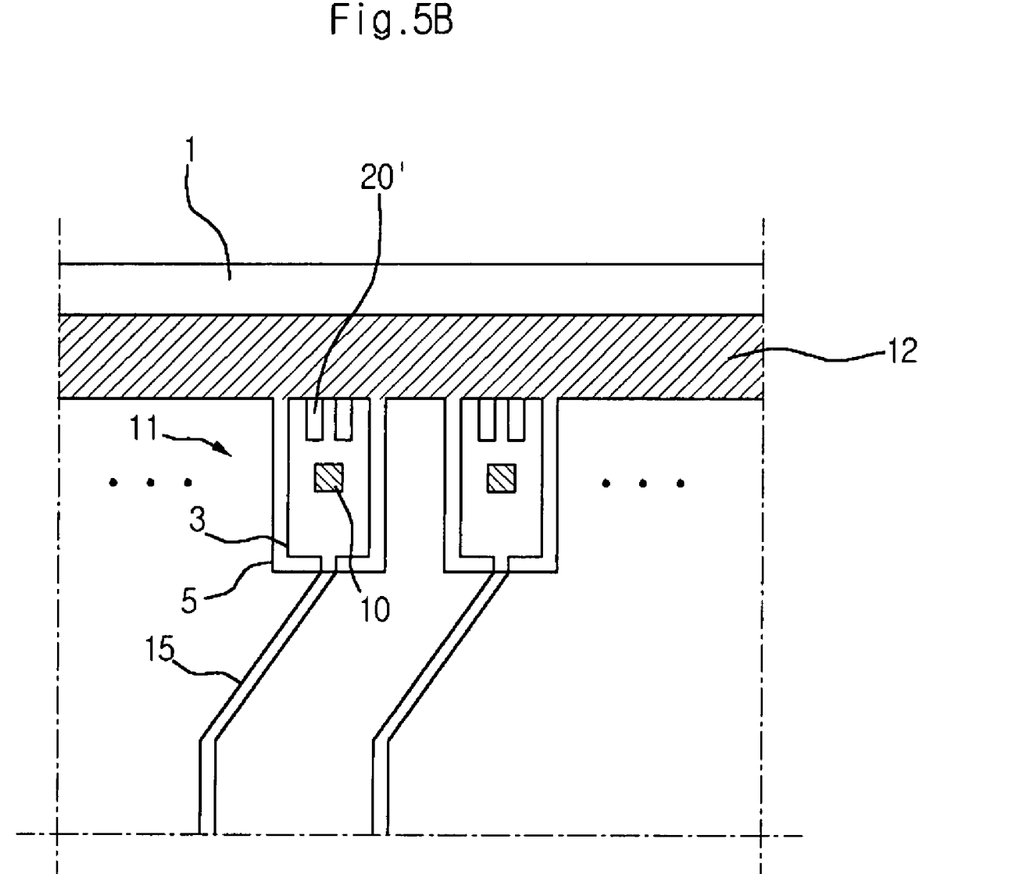

FIGS. 5A and 5B are plan views showing a pad part and a shorting bar formed on a lower substrate of an LCD according to the present invention. Specifically, FIGS. 5A and 5B show a specific portion of an amorphous silicon TFT LCD, i.e., a region corresponding to the specific portion (C) of FIG. 2A according to the related art.

In the above, the amorphous silicon TFT means that the active region of a thin film transistor (TFT) provided in each pixel region of an LCD, i.e., channel region, is formed of amorphous silicon.

The structures of FIGS. 5A and 5B are similar to those of FIGS. 4A and 4B, but have differences in that the pad part is comprised of respective independent pads 11, and the gate lines or the data lines 15 extend directly from the pad 11.

Accordingly, the amorphous silicon TFT LCD according to an embodiment of the present invention is characterized in that the drive circuit is not formed within the substrate, unlike those of FIGS. 4A and 4B; and the holes 20, 20' are formed at an upper portion of each of the independent pads 11, unlike the holes 20, 20' formed at the upper portion of the single pad part 6, as illustrated in FIGS. 4A and 4B.

In other words, in forming the holes 20, 20' and removing the shorting bar 12 by the scribing process, the embodiment of FIG. 5A is similar in the process and hole shape to that of FIG. 4A, and the embodiment of FIG. 5B is similar in the process and hole shape to that of FIG. 4B.

However, there is only a difference between them in that the embodiment of FIGS. 4A and 4B has the holes 20, 20' formed in the single pad part but the embodiment of FIGS. 5A and 5B has the holes 20, 20' formed respectively in the independent pad parts.

Figure 6A:
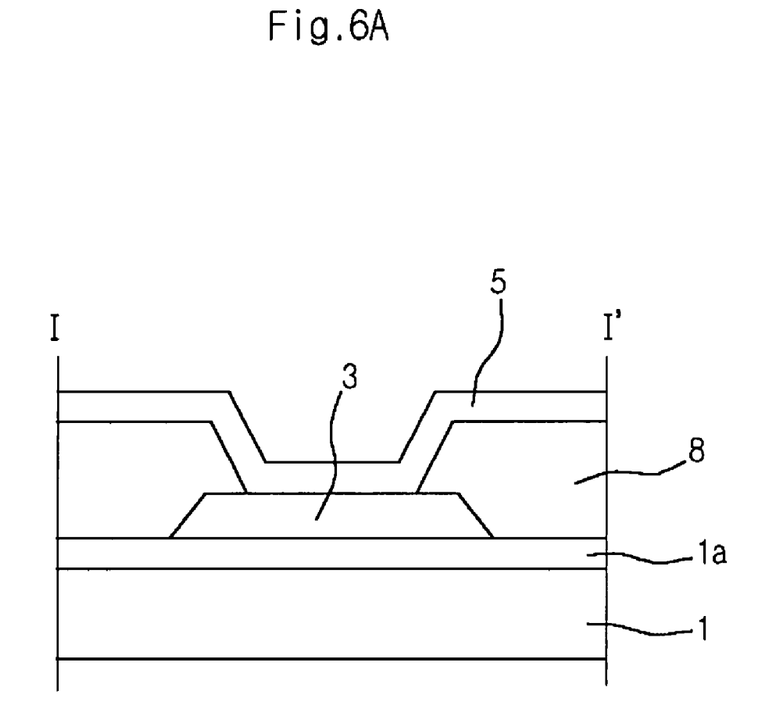
FIGS. 6A and 6B are sectional views taken along the lines I-I' and II-II' of FIG. 4A.
Figure 6B:
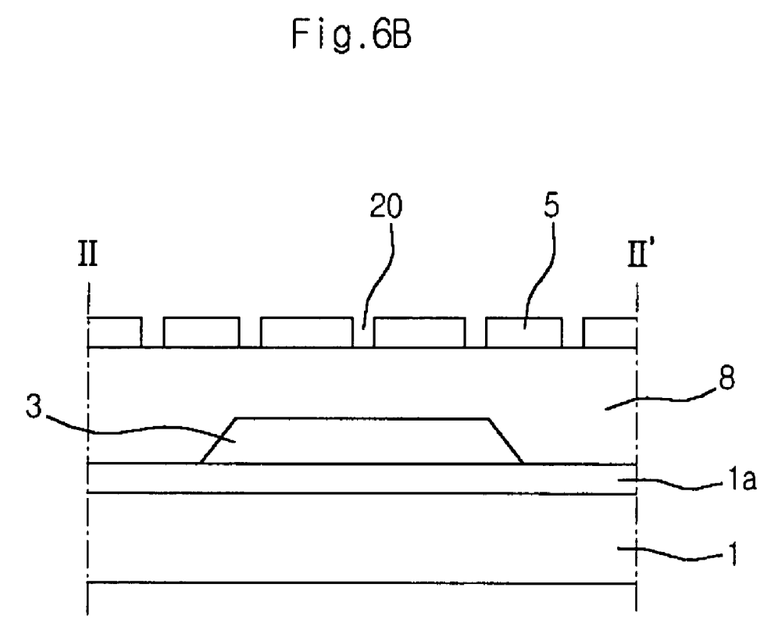

FIGS. 6A and 6B are sectional views taken along the lines I-I' and II-II' of FIG. 4A.

FIGS. 6A and 6B are the same as the sectional views taken along the lines I-I' and II-II' for viewing a specific portion of the pad and are described with reference to FIG. 4A only for the convenience of description.

Referring to FIG. 6A, the section of the pad part in which the holes are not formed, includes a thin metal film pattern 3, and a transparent conductive pattern 5, which is patterned along with the pixel electrode. The thin metal film pattern 3 is formed on a gate insulating layer 1$a$ of inorganic insulator and is patterned along with source/drain electrode of a thin film transistor, a data line connected with the source electrode, and a link pattern.

Also, the transparent conductive pattern 5 is connected with the thin metal film pattern 3 through a contact hole (not shown) formed in a passivation layer 8 of inorganic material or organic material.

The section of the pad part in which the holes are formed is illustrated in FIG. 6B, and is distinguished from the section of FIG. 6A in that the holes 20 are formed at a constant interval and distance, thereby the passivation layer 8 of inorganic material or organic material is directly exposed to the outside through the holes 20.

Thus, the transparent conductive pattern shown in FIG. 6B is formed by an exposing process and a developing process using a photomask having exposure regions corresponding to the holes 20.

Figure 7A:
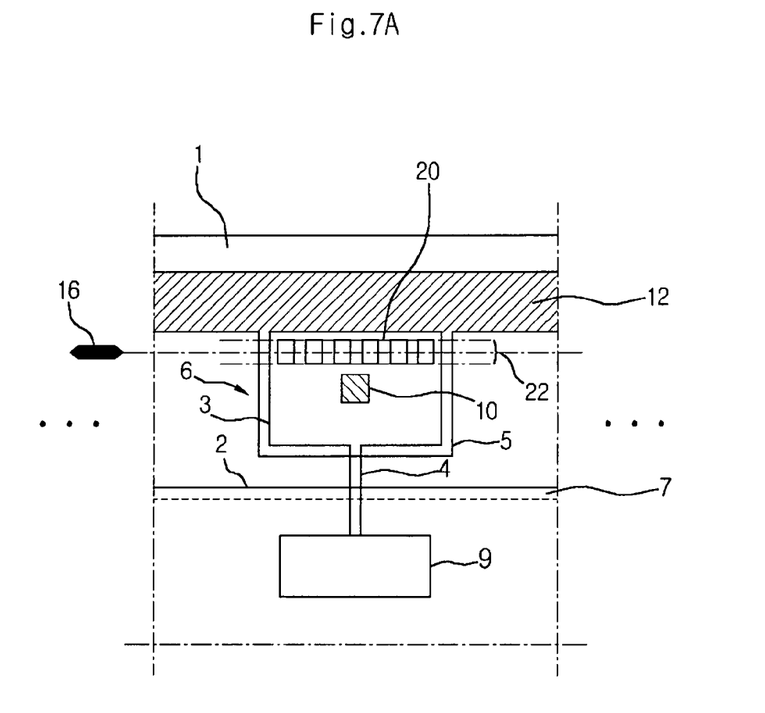
FIGS. 7A to 7C are plan views illustrating that the shorting bar shown in FIG. 4A is removed.
Figure 7B:
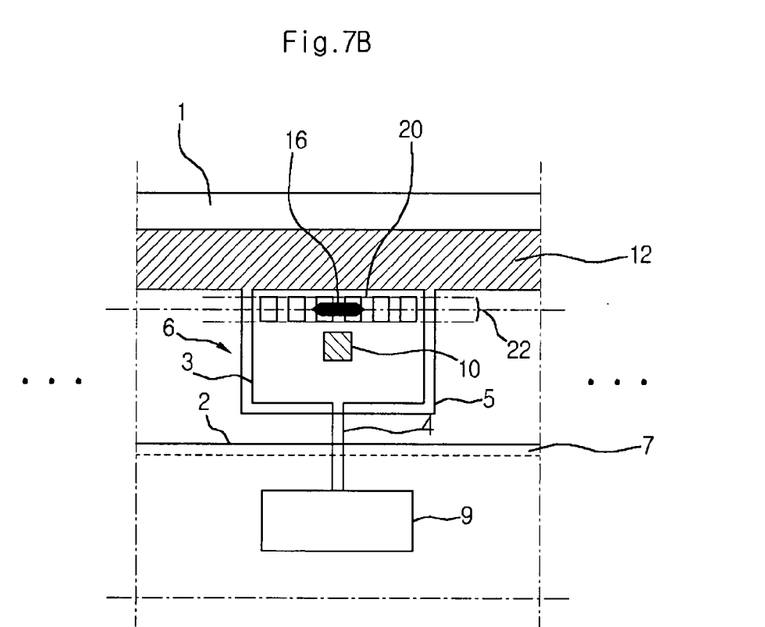
Figure 7C:
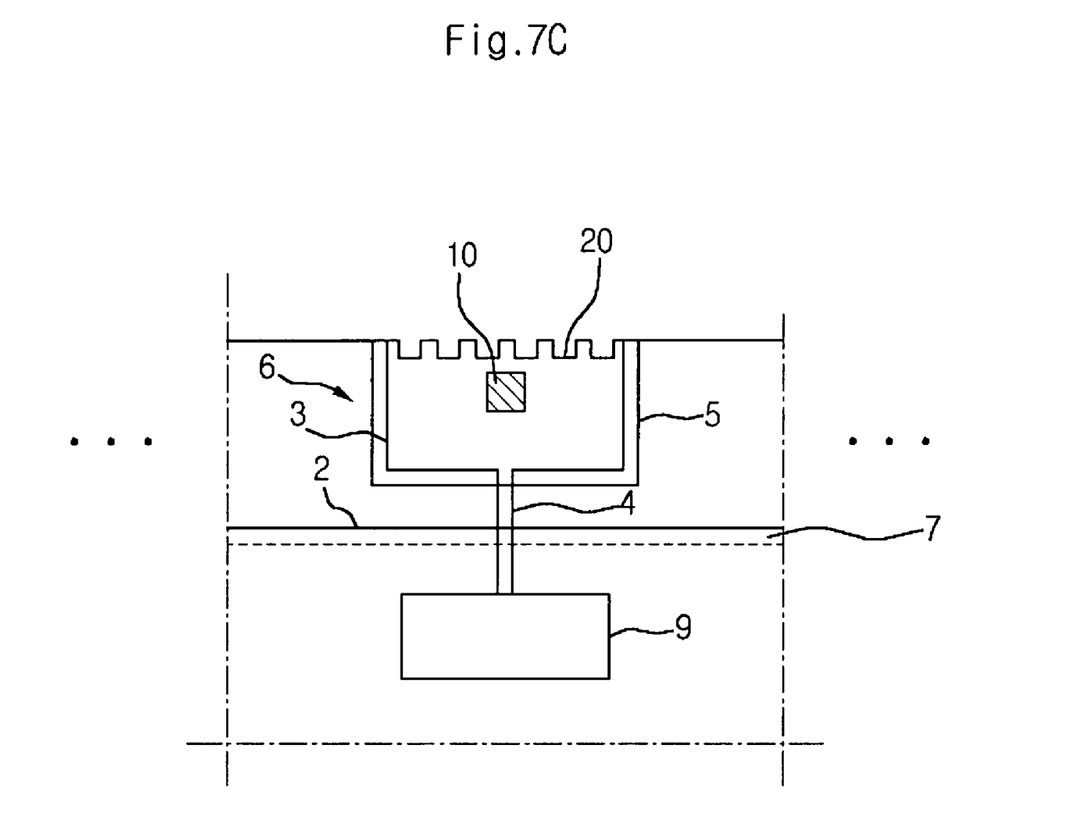

FIGS. 7A to 7C are plan views illustrating that the shorting bar illustrated in FIG. 4A is removed.

It is obvious to those skilled to the art that the removal process of the shorting bar 12 can be equivalently applied to those of FIGS. 4B, 5A and 5B.

Hereinafter, there will be reviewed a removal process of the shorting bar 12 according to the invention with reference to FIGS. 7A to 7C.

First, as shown in FIG. 7A, holes 20 are formed in an inner upper portion of the pad part 6 connected with the shorting bar 12 at a constant distance. In this state, a scribing wheel 16 is aligned to pass on the locations where the holes 20 are formed. At this point, the scribing wheel 16 should pass the portions where the holes 20 are formed, i.e., a path inside a scribe line margin 22.

As the scribing wheel 16 passes on the locations where the holes 20 are formed, the shorting bar 12 is removed from the lower substrate. The removing step of the shorting bar 12 is illustrated in FIG. 7B. By doing so, the grinding step, which is essentially used for removing the shorting bar 12 in the related art, is omitted.

Thus, by performing the scribing process, the shorting bar formed in the respective divided LCD panels. In FIG. 7C, there is illustrated a structure of the pad part 6 when the shorting bar 12 is removed.

As described previously, according to an LCD and fabrication method thereof according to the invention, the shorting bar is removed by one scribing process. As a result, the fabrication process of the LCD is simplified and, accordingly, the production space necessary for a clean room can be reduced.

Also, since holes are formed in the cutting portion of the pad part at a constant distance, metal particles are reduced during the scribing process, so that pad damage can be minimized.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of fabricating a liquid crystal display, comprising:
    forming a lower substrate and an upper substrate, the lower substrate including a plurality of data lines and a plurality of gate lines; a plurality of first pads connected to the data lines; a plurality of second pads connected to the gate lines; and a shorting bar connected to one of the plurality of first pads and the plurality of second pads;
    forming open portions at an inner upper portion of one of the plurality of first pads and a plurality of second pads;
    attaching the lower substrate and the upper substrate to face with each other; and
    scribing the inner portion of the pads to remove the shorting bar and dividing the attached upper and lower substrates into a plurality of LCD panels,
    wherein the open portions expose a passivation layer beneath one of the first and second pads,
    wherein the scribing step is carried out by a scribing wheel passing on the locations where the open portion are formed,
    wherein the shorting bar is grounded to a GND terminal to eliminate static electricity.

2. The method of claim 1, further comprising:
    dispensing a spacer on the lower substrate and forming a seal pattern at a display region on the upper substrate before attaching the lower and the upper substrates;
    providing a liquid crystal layer between the upper and lower substrates.

3. The method according to claim 1, wherein the thin film transistor has an active region made of amorphous silicon.

4. The method according to claim 1, wherein the open portions are holes.

5. The method according to claim 1, wherein the open portions are slots.

6. The method according to claim 2, wherein providing a liquid crystal layer includes dispensing liquid crystal onto one of the upper and lower substrates before they are attached.

7. The method according to claim 1, wherein the lower substrate further includes a data drive circuit connected with the data lines and a gate drive circuit connected with the gate lines; a first pad part connected with the data drive circuit, the first pad part including the first pads; a second pad part connected with the gate drive circuit, the second pad part including the second pads, wherein the shorting bar is connected with one of the first pad part and the second pad part.

8. The method according to claim 7, wherein the thin film transistor has an active region made of polycrystalline silicon.

9. The method according to claim 7, wherein providing a liquid crystal layer includes dispensing liquid crystal onto one of the upper and lower substrates before they are attached.

10. The method according to claim 7, wherein the open portions are holes.

11. The method according to claim 7, wherein the open portions are slots.

* * * * *